(12) United States Patent
Ota et al.

(10) Patent No.: US 6,743,104 B1
(45) Date of Patent: Jun. 1, 2004

(54) PORTABLE GAME MACHINE (75) Inventors: Masahiko Ota, Kyoto (JP); Tetsuya Mominoki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/579,512

(22) Filed: May 26, 2000

Related U.S. Application Data (60) Provisional application No. 60/166,171, filed on Nov. 18, 1999.

(51) Int. Cl.$^7$ .................................................. A63F 9/00
(52) U.S. Cl. ............................. 463/44; 463/37; 463/43; 463/7; 463/46; 463/47
(58) Field of Search ................................. 463/7, 30, 35, 463/36, 37, 44, 47, 43, 1; 273/434, 438

(56) References Cited

U.S. PATENT DOCUMENTS

| | | | | |
|---|---|---|---|---|
| 5,184,830 A | * | 2/1993 | Okada et al. ................ | 273/433 |
| 5,220,260 A | | 6/1993 | Schuler ....................... | 318/561 |
| 5,299,810 A | | 4/1994 | Pierce et al. ................ | 273/434 |
| 5,390,937 A | | 2/1995 | Sakaguchi et al. .......... | 273/434 |
| 5,395,112 A | * | 3/1995 | Darling ........................ | 463/44 |
| 5,405,152 A | | 4/1995 | Katanics ..................... | 273/438 |
| 5,414,337 A | | 5/1995 | Schuler ....................... | 318/561 |
| 5,537,405 A | | 7/1996 | Yoshifuji ................... | 370/60.1 |
| 5,542,672 A | | 8/1996 | Meredith ...................... | 463/37 |
| 5,552,799 A | | 9/1996 | Hashiguchi .................... | 345/3 |
| 5,559,412 A | | 9/1996 | Schuler ....................... | 318/561 |
| 5,629,605 A | * | 5/1997 | Lavan et al. ................ | 340/636 |
| 5,630,170 A | | 5/1997 | Koizumi et al. ............. | 395/834 |
| 5,649,862 A | | 7/1997 | Sakaguchi et al. ............ | 463/44 |
| 5,669,818 A | | 9/1997 | Thorner et al. ................ | 463/30 |
| 5,691,898 A | | 11/1997 | Rosenberg et al. ......... | 364/190 |
| 5,734,373 A | | 3/1998 | Rosenberg et al. ......... | 345/161 |
| 5,739,811 A | | 4/1998 | Rosenberg et al. ......... | 345/161 |
| 5,889,672 A | | 3/1999 | Schuler et al. .............. | 364/188 |
| 5,897,437 A | | 4/1999 | Nishiumi et al. ............. | 463/47 |
| 5,917,266 A | | 6/1999 | Murai et al. ................ | 310/316 |
| 5,919,092 A | | 7/1999 | Yokoi et al. .................. | 463/37 |
| 5,938,531 A | | 8/1999 | Yasushi et al. ............... | 463/36 |
| 5,984,785 A | | 11/1999 | Takeda et al. ................ | 463/38 |

(List continued on next page.)

FOREIGN PATENT DOCUMENTS

| | | | |
|---|---|---|---|
| EP | 0 834 338 | | 4/1998 |
| JP | 02000126466 A | * | 5/2000 |
| WO | 97/12357 | | 4/1997 |
| WO | WO 98/16285 | | 4/1998 |

OTHER PUBLICATIONS

Redmond, Business Wire, Jul. 1997 internet site www.bellshome.com/shawn/newsal/htm.*

*Primary Examiner*—Teresa Walberg
*Assistant Examiner*—Yveste Cherubin
(74) *Attorney, Agent, or Firm*—Nixon & Vanderhye PC (57) ABSTRACT

A game cartridge is provided for use with a portable game machine having a processing system to execute a video game program and player controls operable by a player to generate video game control signals. The game cartridge includes a housing, a game memory for storing a video game program executable by the processing system, and electrical contacts that, in use, electrically connect the game cartridge to the processing system. The game cartridge also includes a vibration source for vibrating the housing and a driving circuit responsive to instructions from the processing system for controlling the vibration source.

38 Claims, 10 Drawing Sheets

U.S. PATENT DOCUMENTS

| | | |
|---|---|---|
| 5,984,788 A | 11/1999 | Lebensfeld et al. ............ 463/51 |
| 5,989,120 A | 11/1999 | Truchsess ...................... 463/7 |
| 5,989,123 A | 11/1999 | Tosaki et al. .................. 463/37 |
| 5,993,318 A | 11/1999 | Kousaki ....................... 463/35 |
| 5,999,197 A | 12/1999 | Satoh et al. ................. 345/515 |
| 6,006,352 A | 12/1999 | Kitabatake .................. 714/752 |
| 6,142,869 A * | 11/2000 | Meyer et al. ................... 463/1 |
| 6,195,672 B1 | 2/2001 | Gouger et al. .............. 708/204 |
| 6,200,253 B1 | 3/2001 | Nishiumi et al. .............. 563/47 |
| 6,275,213 B1 | 8/2001 | Tremblay et al. ............ 345/156 |
| 6,312,335 B1 | 11/2001 | Tosaki et al. .................. 463/37 |
| 6,361,436 B1 | 3/2002 | Gouji et al. .................... 463/7 |

* cited by examiner

PORTABLE GAME MACHINE

RELATED APPLICATION

This application claims the benefit of U.S. Provisional Application No. 60/166,171, filed Nov. 18, 1999, the entire content of which is incorporated herein by reference.

FIELD OF THE INVENTION

This invention generally relates to a portable game machine and, more particularly, to a portable game machine that is configured to accept a cartridge having a selectively driven vibration source.

BACKGROUND AND SUMMARY OF THE INVENTION

Over the years, portable (or hand-held) game machines have been (and continue to be) very popular. Typically, these portable game machines include a hand-held game machine housing a processing unit and associated hardware for running a game program, and include a display for displaying images of the game. The game program itself is typically contained in a game program memory such as, for example, a semiconductor memory (e.g., ROM, EPROM, etc.) that is part of a removable cartridge. By storing the game program in a removable cartridge, the user can conveniently and easily change the game being played by simply exchanging one cartridge with another, different cartridge containing a different game. An example of a portable game machine is the "Game Boy®" product available from Nintendo of America, Inc.

Various improvements have been and continue to be made to portable game machines. One such improvement provides for the color display of video game images. A portable game machine providing such a color display is described in application Ser. No. 09/321,201 filed on May 27, 1999, the contents of which are incorporated herein in their entirety. However, in addition to improvements to the audio and visual aspects of portable game machines described in the '201 application and elsewhere, it nonetheless remains desirable to provide new features that enhance a player's game playing experience.

This application describes an arrangement for enhancing a player's gaming experience by providing physical sensations during game play. This physical sensation is preferably provided by vibrating the entire housing of the portable game machine. Since the player holds the housing of the portable game machine during game play, the vibrations of the housing create physical sensations that are felt by the player. The timing and strength of the vibrations are preferably coordinated/synchronized with the action of the video game being played. Thus, for example, in a pinball-type video game, vibrations may be generated when the video pinball contacts a bumper or flipper, thereby simulating the sensation that one would experience when playing an actual pinball game. In a race car video game, vibrations may be generated that simulate the sensation of holding the steering wheel of a race car during a race. The strength of these vibrations may be varied based on the car's speed, whether the car is turning, how much the car is turning, etc. Different vibrations may be generated when a car skids or crashes.

The vibrations are preferably provided by a vibration source that is arranged in a cartridge that is removably attachable to the portable game machine. When the cartridge is attached to the game machine, the vibration source is responsive to commands from the processing system of the game machine to generate vibrations that vibrate the housing of the cartridge. Since the cartridge is attached to the game machine, these vibrations are transferred to the housing of the game machine and therefore to the hands of a player holding the game machine.

Thus, in accordance with one aspect of the present invention, a game cartridge is provided for use with a portable game machine having a processing system to execute a video game program and player controls operable by a user to generate video game control signals. The game cartridge includes a housing, a game memory for storing a video game program executable by the processing system, and electrical contacts that, in use, electrically connect the game cartridge to the processing system. The game cartridge also includes a vibration source for vibrating the housing and a driving circuit responsive to instructions from the processing system for controlling the vibration source.

The instructions from the processing system include instructions for starting and stopping operation of the vibration source and instructions for changing the strength of vibrations generated by the vibration source. The vibration source may be a motor having an eccentric member attached to a rotating shaft or a motor having an eccentrically mounted armature coil. Other types of vibration sources include, but are not limited to, solenoids.

In accordance with another aspect of the present invention, a portable game machine includes a processing system to execute a video game program and player controls operable by a player to generate video game control signals. A connector of the portable game machine is connected, in use, to a game cartridge including a vibration source. The processing system is configured to generate at least one instruction for controlling the vibration source during execution of a video game program.

Thus, the vibration generating circuitry is controllable in accordance with instructions from the processing system during execution of a video game program. The vibrations generated by the vibration source are transferred to the hands of a player holding the game machine. By coordinating the starting and stopping of the vibration source and the strength of the vibrations with the game activity, a player can experience the game not only by sight and sound, but also by touch.

Still other aspects, features and advantages of the present invention will become more apparent from the following detailed description when read in conjunction with the accompanying drawings.

DETAILED DESCRIPTION

The present invention is described in the context of exemplary embodiments. However, the scope of the invention is not limited to the particular embodiments and examples described herein. Rather, the description merely reflects certain practical and preferred embodiments, and serves to illustrate the principles and characteristics of the present invention. Those skilled in the art will recognize that various modifications and refinements may be made without departing from the spirit and scope of the invention.

Figure 1:
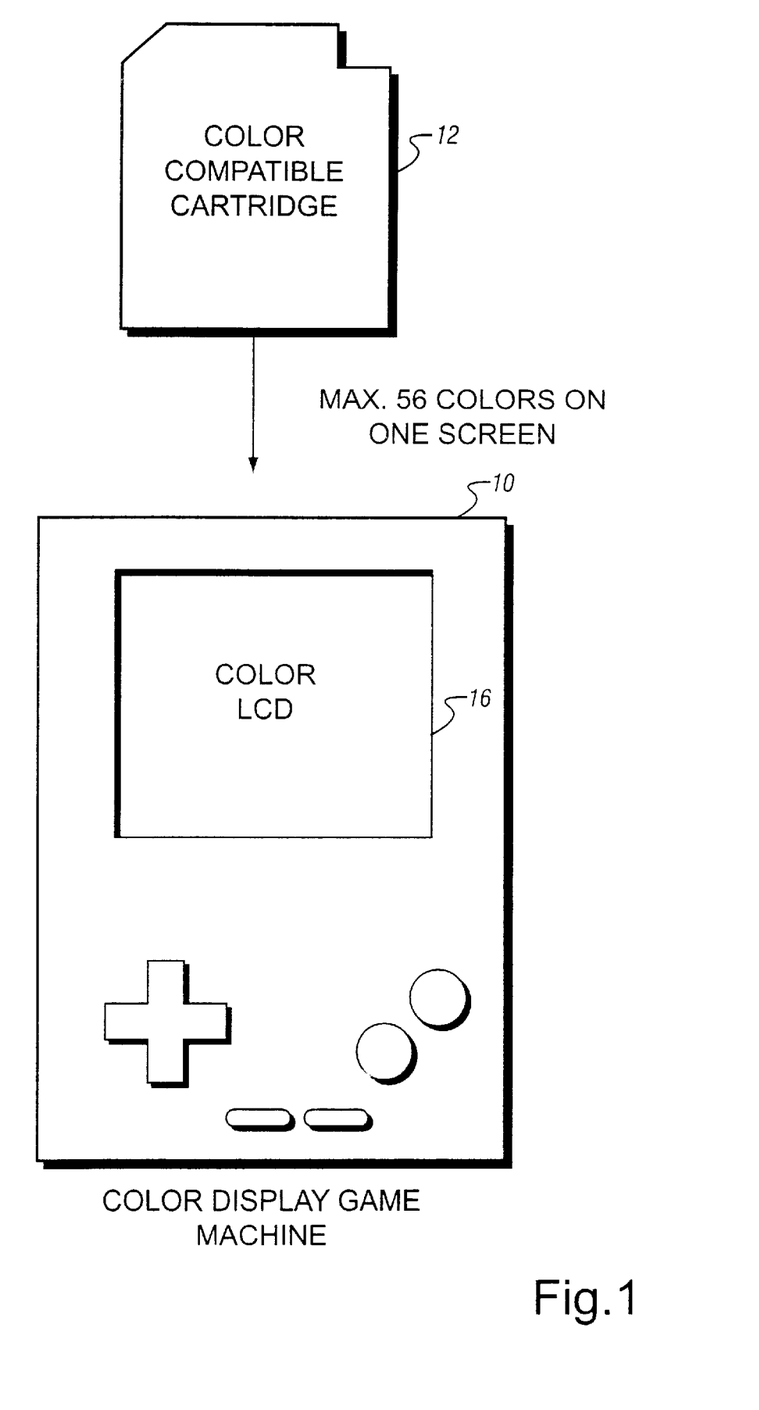
FIG. 1 schematically illustrates a portable game machine 10 and a game cartridge 12 that is selectively attachable to portable game machine 10.
Figure 2:
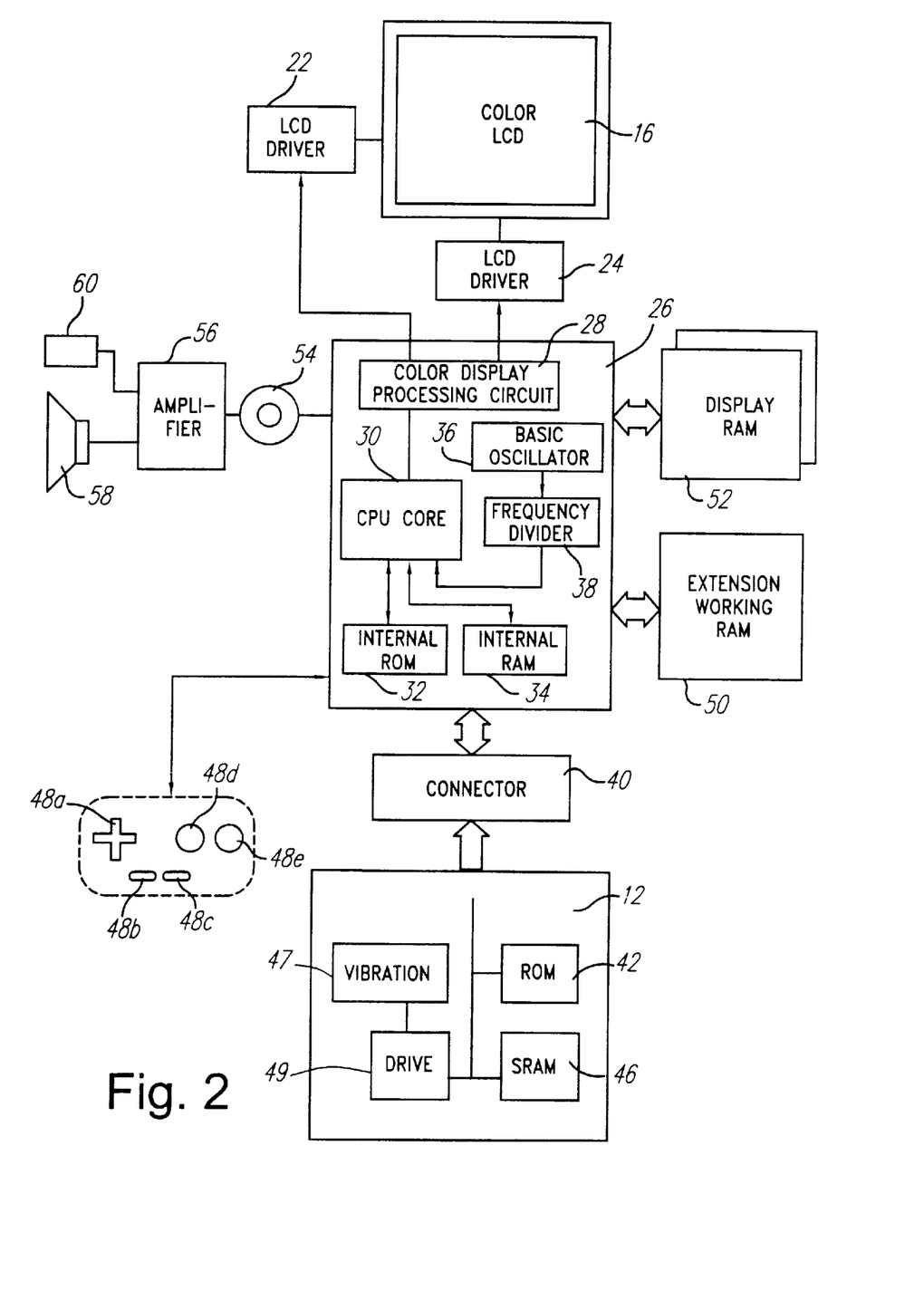
FIG. 2 is an overall block diagram of game cartridge 12 and game machine 10 shown in FIG. 1.

A portable (hand-held) color display game machine (hereinafter, referred to simply as "game machine") 10 will be described with reference to FIGS. 1–3. FIG. 1 schematically illustrates portable game machine 10 and a game cartridge 12 that is selectively attachable to portable game machine 10; FIG. 2 is an overall block diagram of game cartridge 12 and game machine 10 shown in FIG. 1; and FIG. 3 is a front perspective view of game machine 10.

Figure 3:
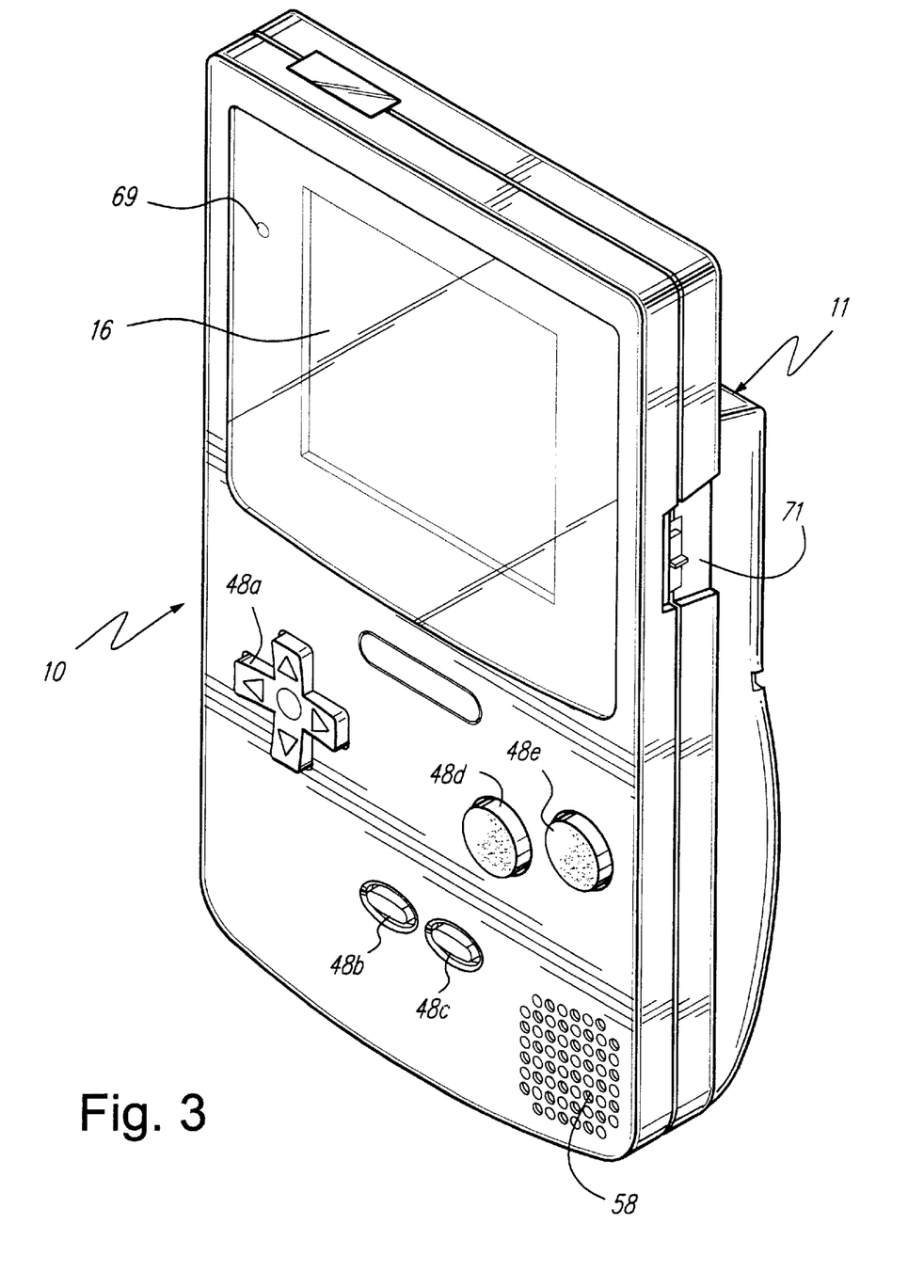
FIG. 3 is a front perspective view of game machine 10.
Figure 4:
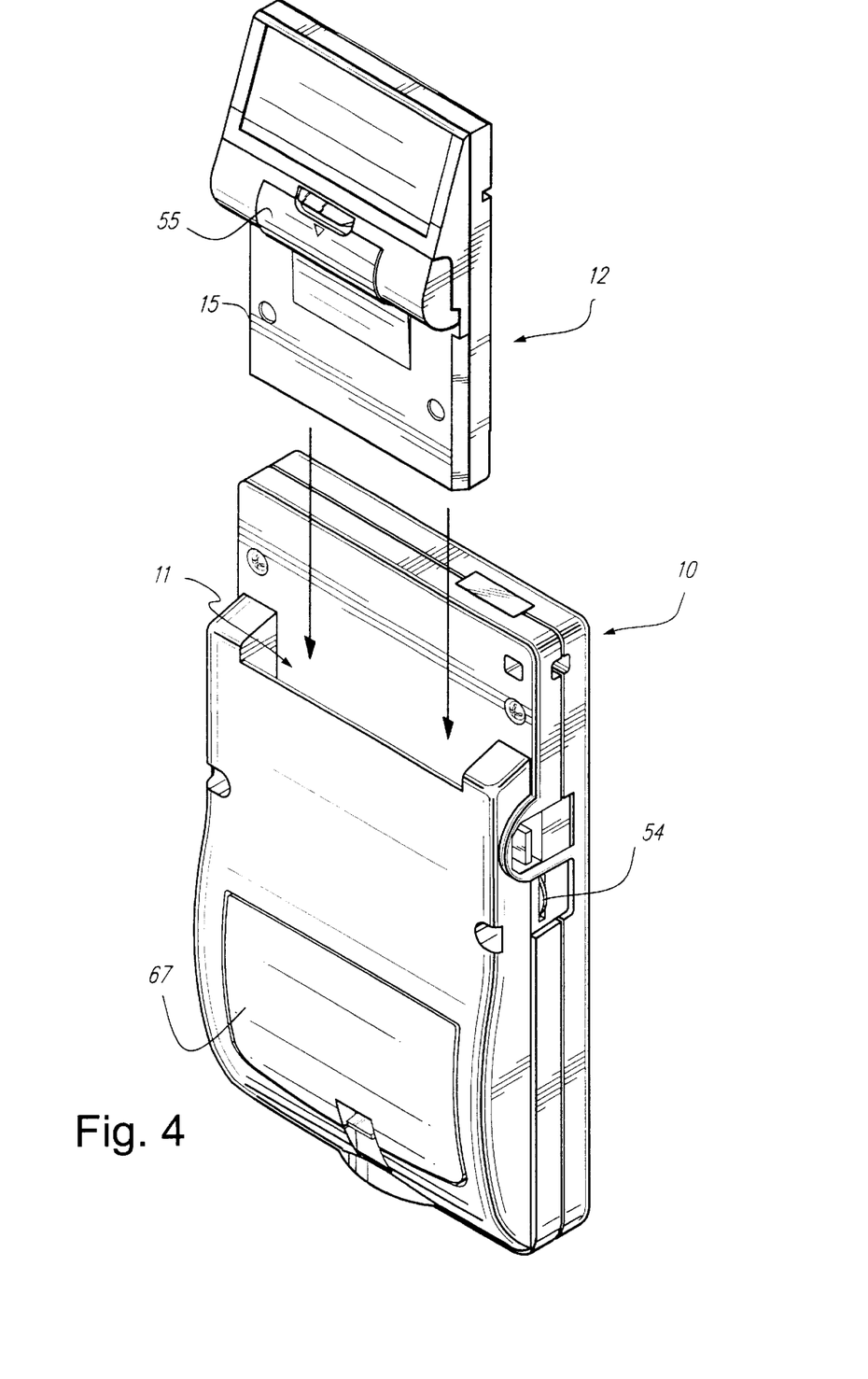
FIG. 4 is a perspective view illustrating game cartridge 12 being inserted into game machine 10.

Game machine 10 displays game characters in color on a color liquid crystal display (LCD) 16 when a color-ready (color compatible) game cartridge 12 is selectively inserted into a slot or opening 11 of game machine 10 (see FIGS. 3 and 4). Color LCD 16 displays characters using, for example, up to a maximum of 56 colors if color-ready game cartridge 12 is inserted into game machine 10. Game machine 10 may, for example, be a GameBoy Color game machine available from Nintendo of America, Inc.

With reference to FIG. 2, game machine 10 includes color LCD 16 as described above. Color LCD 16 is formed as a dot matrix display and is driven by LCD drivers 22 and 24 to display color images on its screen. LCD driver 22 selectively drives, for example, the rows of the dot matrix display and LCD driver 24 selectively drives, for example, the columns of the dot matrix display. LCD drivers 22, 24 are supplied with color image signals from a color display processing circuit 28 included in a central processing unit (CPU) 26.

CPU 26 further includes a CPU core 30 that is connected to an internal read only memory (ROM) 32 and an internal random access memory (RAM) 34. Internal RAM 34 is used as a work memory of CPU core 30. CPU 26 further includes a basic oscillator 36. Basic oscillator 36 is formed of, for example, a quartz oscillator, and supplies an oscillating signal to a programmable frequency divider 38. Programmable frequency divider 38 divides the oscillating signal from basic oscillator 36 in accordance with frequency division data from CPU core 30, and supplies a divided signal as a clock of CPU core 30.

A connector 40 is connected to CPU 26 by an appropriate bus. Game cartridge 12 shown in FIG. 1 is selectively attached to game machine 10 via connector 40. Game cartridge 12 is preferably in the form of a replaceable memory cartridge insertable into slot 11 of game machine 10. As will be explained in greater detail below, game cartridge 12 is in the form of a plastic housing that encases a printed circuit board. The printed circuit board has an edge defining a number of electrical contacts. When game cartridge 12 is inserted into slot 11 of game machine 10 (see FIG. 4), the cartridge electrical contacts mate with corresponding "edge connector" electrical contacts of connector 40. This action electrically connects the printed circuit board contained within the plastic housing to the electronics within game machine 10. At least a read-only memory (ROM) 42 and an SRAM 46 are mounted on the printed circuit board of game cartridge 12. As will be explained in greater detail below, game cartridge 12 further includes a vibration source 47 and a driver circuit 49 for driving vibration source 47. Like ROM 42 and SRAM 46, driver circuit 49 is mounted on the printed circuit board of game cartridge 12. ROM 42 stores instructions and other information pertaining to a particular video game. ROM 42 for one game cartridge 12 may, for example, contain instructions and other information for an adventure game while ROM 42 of another game cartridge 12 may contain instructions and other information for a car race game, an educational game, etc. SRAM 46 is used to store data such as game backup data. Vibration source 47 is driven by driver circuit 49 in response to instructions from CPU 26 of game machine 10 during game play. Vibration source 47 is arranged within the housing of game cartridge 12 so that, when driven by driver circuit 49, vibrations generated by vibration source 47 are transferred to the housing of game cartridge 12. By way of example, by attaching vibration source 47 to the housing of game cartridge 12, vibrations generated when drive circuit 49 drives vibration source 47 will be transferred to the housing of game cartridge 12. Since game cartridge 12 is attached to game machine 10, the vibrations of the housing of game cartridge 12 are transferred to game machine 10. A player holding game machine 10 is able to feel the vibrations of game machine 10.

To play a game, a user of game machine 10 need only plug an appropriate game cartridge 12 into slot 11 of game machine 10—thereby connecting the cartridge's ROM 42 and other any circuitry it may contain (including vibration source 47 and driver circuit 49) to game machine 10. This enables the game machine circuitry to access game instructions contained with ROM 42, which instructions control game machine 10 to play the appropriate video game by displaying images and reproducing sound. As will be explained in greater detail below, the ROM game program instructions include instructions driving vibration source 47 to vibrate game machine 10 while it is being held by a player.

CPU 26 is supplied with operation signals from operating keys 48a–48e. Operating key 48a is used, among other things, to move a game character displayed on color LCD 16 in four directions, that is, upward, downward, right and left. Operating key 48b is a select key that is used for, for example, game mode selection and the like. Operating key 48c is a so-called start key that is used to start playing the game or to temporarily stop the progress of the game. Operating keys 48d, 48e are push-button switches. By pushing operating keys 48d, 48e, it is possible to cause various motions of the game characters displayed on color LCD 16, for example, a weapon use, a jump and the like. Operating keys 48a–48e are disposed in a forward surface of game machine 10 as shown in FIG. 3. Operating keys 48a–48e are also usable in connection with various features described below. A key matrix (not shown) is provided for sending CPU 26 the operation signals from operating keys 48a–48e as controller data.

Game machine 10 is powered by batteries (not shown) suitably arranged in a battery compartment 67 (see FIG. 4). A power indicator LED 69 (see FIG. 3) may dim as the batteries lose their charge, thereby providing a visual indication to the user that new batteries are needed. Game machine 10 may also be configured for connection to an AC adapter to permit extended use without batteries. In addition, CPU 26 may be configured to detect the power level of the batteries for game machine 10 and to provide a suitable message on display 16 if the detected power level is less than some predetermined level.

In accordance with the instructions of the video game program and character data supplied from game cartridge 12 and game control data from operating keys 48a–48e, CPU 26 executes data processing and writes display data into a display RAM 52, using an extended RAM 50 when necessary. The display RAM 52 has two banks, that is, a first bank and a second bank, and has, as a whole, a storage area that is greater than the display area of color LCD 16, thereby enabling a scrolling display upward and downward and/or rightward and leftward on the screen of color LCD 16.

Also as a result of the data processing by CPU 26, sound signals to be output are adjusted in level by volume controls 54 and 56, and then outputted to a speaker 58 and/or an earphone jack 60. Sound signals output from speaker 58 and/or earphone jack 60 include game sound effects, voices and music.

As a still further result of the data processing by CPU 26, instructions for driving vibration source 47 are supplied to driver circuit 49. In response to these instructions, driver circuit 49 selectively starts the operation of vibration source 47, stops the operation of vibration source 47, and/or changes the strength of the vibrations generated by vibration source 47.

Generally speaking, to use game machine 10 to play a game, a user selects a game cartridge 12 containing a desired video game, and inserts that game cartridge into slot 11 of game machine 10 as shown in FIG. 4, thereby electrically connecting ROM 42 and other cartridge electronics to game machine 10. The user then operates a power switch 71 (see FIG. 3) to turn on game machine 10 and operates operating keys 48a–48e to control video game play. For example, depressing operating key 48c may cause the video game to start playing. Actuating operating key 48a may cause animated characters to move on color LCD 16 in controllably different directions.

Figure 5:
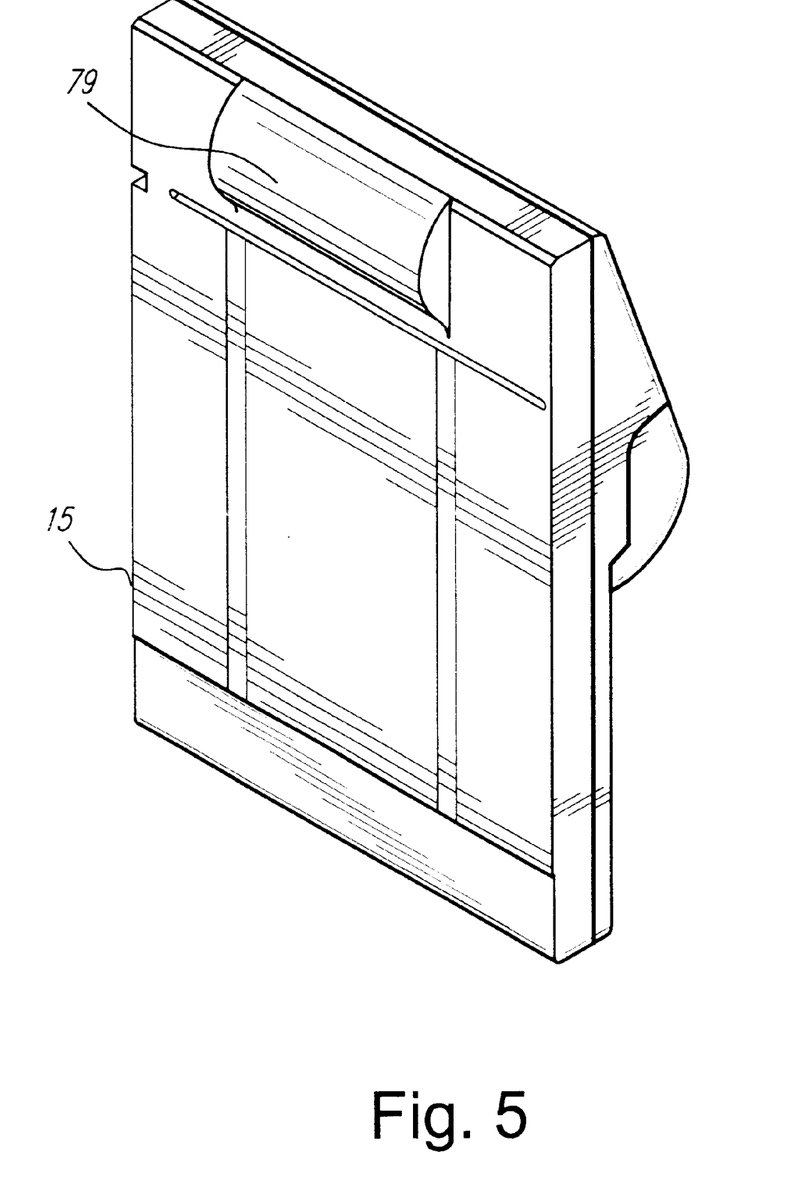
FIG. 5 is a rear perspective view of game cartridge 12.
Figure 6:
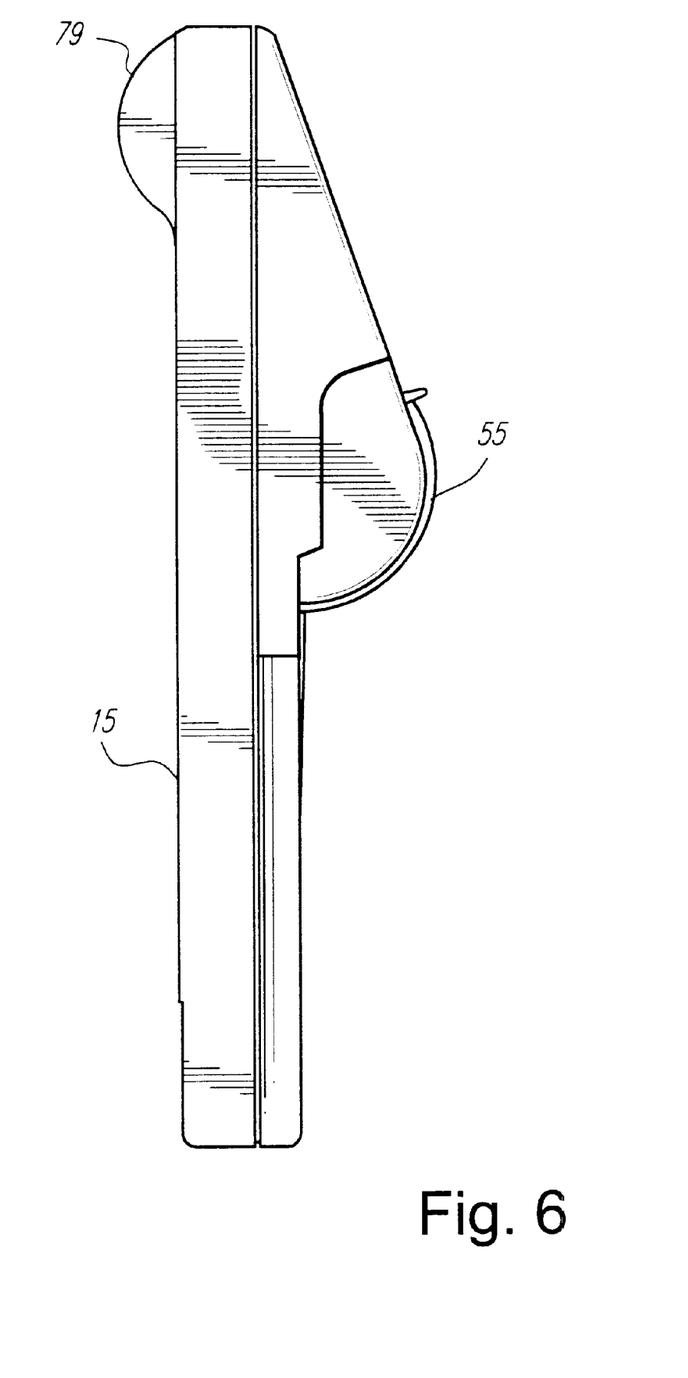
FIG. 6 is a side perspective view of game cartridge 12.
Figure 7:
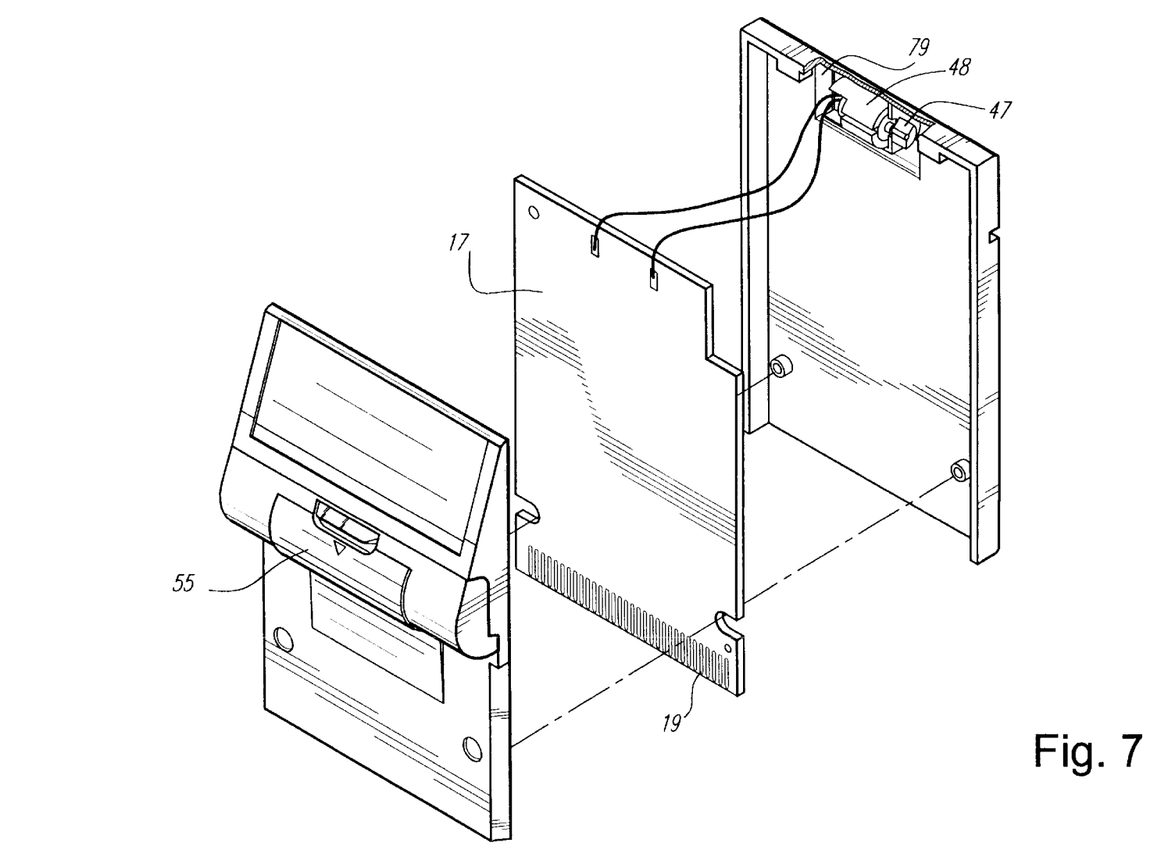
FIG. 7 is an exploded view of game cartridge 12.

Referring to FIGS. 2 and 4–7, game cartridge 12 will be described in detail. FIG. 4 is a perspective view illustrating game cartridge 12 being inserted into game machine 10; FIG. 5 is a rear perspective view of game cartridge 12; FIG. 6 is a side perspective view of game cartridge 12; and FIG. 7 is an exploded view of game cartridge 12.

Game cartridge 12 includes a cartridge housing 15 made of, for example, plastic. Cartridge housing 15 is configured so that game cartridge 12 is insertable into and removable from a slot 11 of game machine 10 as shown in FIG. 4. Cartridge housing 15 houses a printed circuit board 17 on which is provided ROM 42, SRAM 46, driver 49, back-up battery 51, and battery 53 (see FIGS. 8 and 9). Printed circuit board 17 has a front edge on which a number of electrical contacts 19 are formed. When game cartridge 12 is inserted into slot 9 of game machine 10, cartridge electrical contacts 19 mate with corresponding "edge connector" electrical contacts of connector 40 within game machine 10. This action electrically connects the electrical components of game cartridge 12 to the electronics within game machine 10 and, more specifically, permits the communication of data and addresses between CPU 26 of game machine 10 and the electrical components of game cartridge 12. In this way, CPU 26 can, among other things, address ROM 42 and supply address data and vibration strength data to driver 49 to control the operation of vibration source 47.

As shown in FIG. 7, cartridge housing 15 is configured to provide a recess 79 within which vibration source 47 is positioned. Vibration source 47 is electrically connected via wire(s) to the circuit pattern formed on printed circuit board 17 and is attached to cartridge housing 15. If desired, a noise-reducing material 48 such as rubber or foam may be interposed between vibration source 47 and cartridge housing 15 to reduce noise that would result from vibration source 47 directly impacting against plastic cartridge housing 15. By attaching vibration source 47 to cartridge housing 15, vibrations generated by vibration source 47 can be easily conveyed to the hands of a player holding game machine 10. That is, vibrations generated by vibration source 47 are conveyed from cartridge housing 15 to the housing of game machine 10 and, therefore, game machine 10 itself is vibrated. Accordingly, vibrations generated by vibration source 47 are conveyed to the hands of a player holding game machine 10.

Provided that vibrations of vibration source 47 can be effectively conveyed to the hands of a player holding game machine 10 and that game cartridge 12 is physically configured for selective attachment to game machine 10, vibration source 47 can be mounted at any position within cartridge housing 15. However, it is preferable that vibration source 47 not be mounted on printed circuit board 17 because the vibrations of vibration source 47 could adversely affect components mounted on printed circuit board 17. In addition, mounting vibration source 47 on printed circuit board 17 could adversely affect the physical and electrical contact between electrical contacts 19 of game cartridge 12 and the electrical contacts of connector 40 of game machine 10. Of course, provided there are no adverse results, vibration source 47 can be mounted on printed circuit board 17. Since printed circuit board 17 is secured to cartridge housing 15, vibrations from a vibration source mounted on printed circuit board 17 will be transferred to the body of game machine 10.

In the implementation shown in FIG. 7, a motor is utilized as vibration source 47. One type of motor that may be used is a motor in which an eccentric member is attached to a rotation shaft incorporated within in a cylindrical case. The eccentric member is rotated according to the rotation of the rotation shaft to generate vibrations. Since the motor is attached to cartridge housing 15, vibrations are generated on cartridge housing 15. Another type of motor that may be used in one in which an armature coil is mounted in an eccentric manner. By rotating the armature, vibrations are generated. It will be recognized that solenoids or other elements that generate vibrations when electric power is supplied thereto may also be utilized. In the case of a solenoid, a core within the solenoid is reciprocally moved to generate vibrations.

In any case, vibration source 47 is driven by driver circuit 49. Since the consumption of electric power by vibration source 47 is relatively large, battery 53 is provided for vibration source 47 and a separate battery 51 is provided for SRAM 46. Battery 53 is contained within a battery compartment that is accessible via lid 55 (see FIGS. 4 and 6). If battery 53 is consumed, a new battery 53 can be easily provided by the user of game machine 10 by removing lid 55. It is of course possible to use a single battery in place of the two batteries 51 and 53. In addition, it is also possible to supply power to SRAM 46 and/or vibration source 47 via an electrical connection with the batteries of game machine 10.

Figure 8:
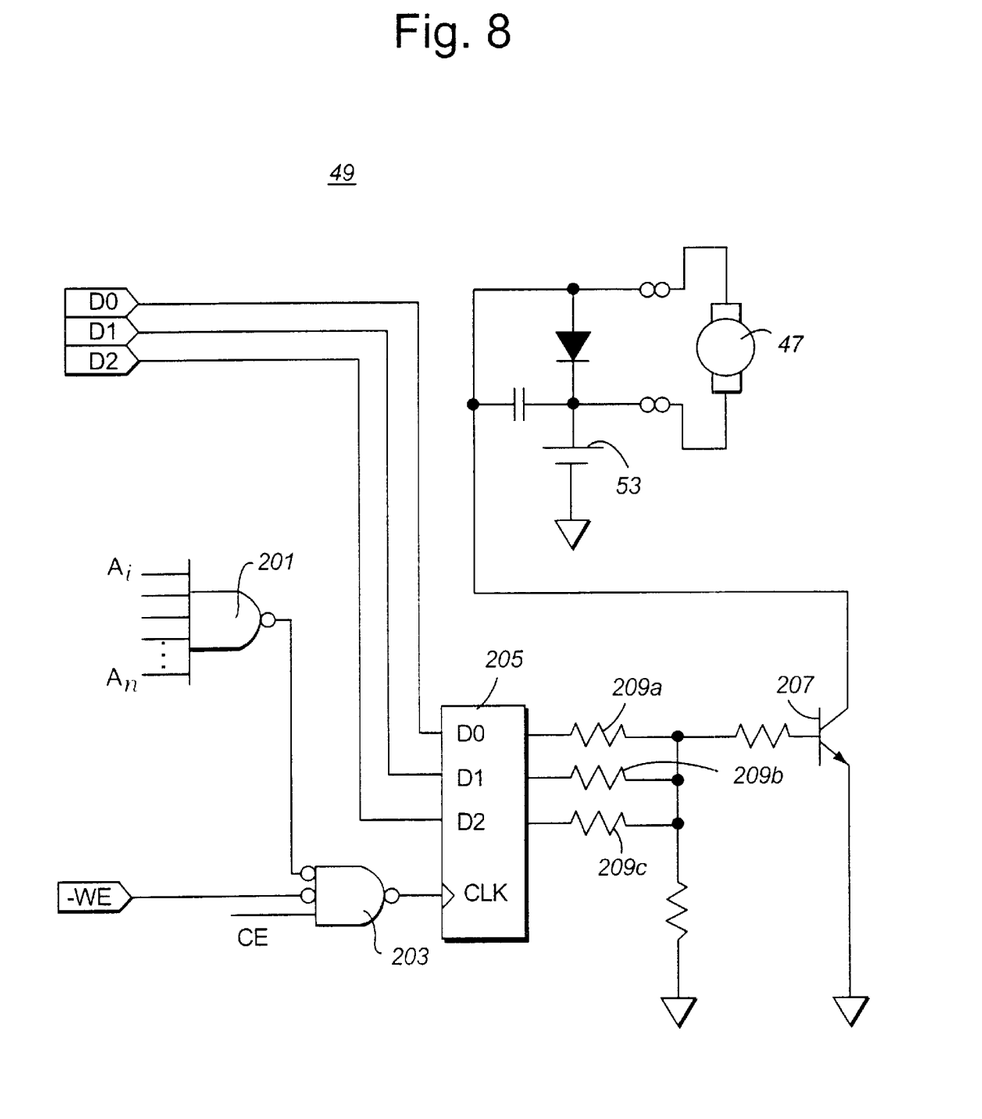
FIG. 8 shows one example of driver circuit 49 for driving vibration source 47.

Several possible embodiments of driver circuit 49 will be described. With reference to FIG. 8, driver circuit 49 is shown as including a decoder composed of a NAND logic gate 201. NAND logic gate 201 receives address data $A_i$–$A_n$ (i and n are integers) from CPU 26 of game machine 10 via electrical contacts 19. When addresses $A_i$–$A_n$ are all "1", a vibration mode is set and data for driving vibration source 47 is outputted from CPU 26. More specifically, if address $A_i$–$A_n$ are all "1", the output of NAND logic gate 201 becomes "0". The output of NAND logic gate 201 is applied to a NAND logic gate 203. NAND logic gate 203 is also supplied with a write signal/WE and a chip enable signal CE, both supplied from CPU 26. Therefore, NAND logic gate 203 applies a latch signal to a latch 205 in response to the output of NAND logic gate 201 and the signals/WE and CE. Accordingly, latch 205 latches data D0–D2 from CPU 26 at a time that addresses $A_i$–$A_n$ are all "1".

Data D0–D2 is data for setting a strength of the vibrations to be generated by vibration source 47, and it is possible to set strength levels of "1–8" using three data bits. For example, if the data D0–D2 is "100", strength level "1" is set, and if the data D0–D2 is "111", strength level "7" is set. Latch 205 has three outputs, and the respective outputs are connected to a base of a driver transistor 207 via resistors 209a, 209b and 209c. Resistance values of resistors 209a, 209b and 209c are 4R, 2R and R, respectively. Therefore, if "1"s are outputted on all three outputs, a maximum base voltage is applied to transistor 207, and if the three outputs are "1","0" and "0", a minimum base voltage is applied to transistor 207. Accordingly, a controller-emitter current of transistor 207 is changed, and in response thereto, a driving current flowing from battery 53 to vibration source 47 is changed. These changes in driving current change the strength of the vibrations generated by vibration source 47. Thus, by suitably setting data bits D0–D2, the strength of vibrations generated by vibration source may be varied.

Figure 9:
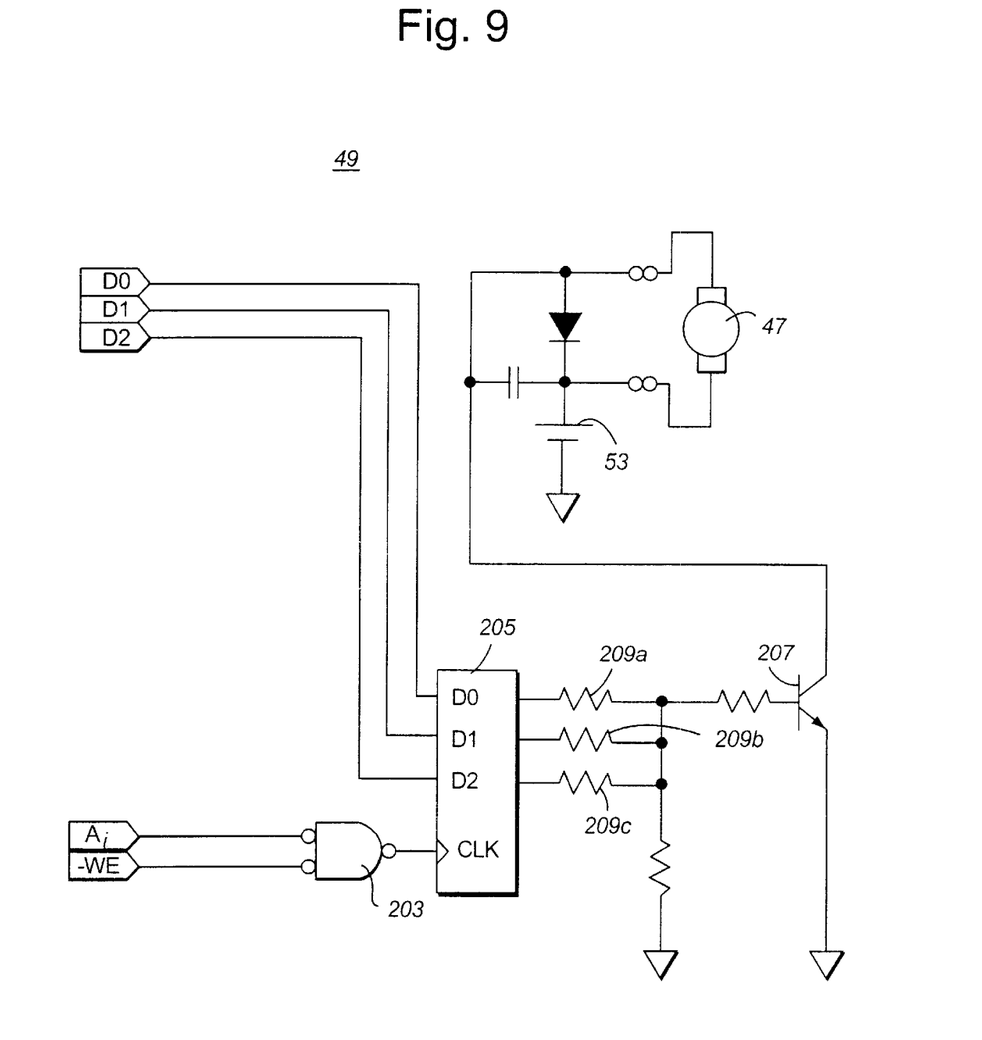
FIG. 9 shows another example of driver circuit 49 for driving vibration source 47.

FIG. 9 shows a modification of driver circuit 49 shown in FIG. 8. The FIG. 9 embodiment is different from the FIG. 8 embodiment in that decoder 201 of FIG. 8 is not utilized. That is, in the FIG. 9 embodiment, an address bit $A_j$ of CPU 26 is directly applied to NAND logic gate 203. Therefore, NAND logic gate 203 applies the latch signal to latch 205 in response to the write signal AWE of CPU 26. Therefore, in the FIG. 9 embodiment, the vibration mode is set at a time that the address bit $A_j$ of CPU 26 becomes "1", and data bits D0–D2 are latched by latch 205, and driver transistor 207 is controlled by the data bits.

In addition, vibration source 47 may be controlled utilizing the data bit D0 of the data bus of CPU 26 only, for example. In this case, latch 205 shown in FIG. 8 or in FIG. 9 latches the data of the data bit D0 in the vibration mode. Then, latch 205 has only a single output, and the output applies the voltage to the base of transistor 207. Therefore, in this case, transistor 207 is simply turned-on or -off by "1" or "0" of the data bit D0. Thus, the strength of the vibrations generated by vibration source 47 is constant.

The timing and strength of the vibrations generated by vibration source 47 are preferably coordinated with respect to the action of the video game being played. Thus, for example, in a pinball-type video game, CPU 26 of game machine 10 may generate instructions for generating vibrations when the video pinball contacts a bumper, thereby simulating the sensation that one would experience when playing an actual pinball game. In a race car video game, CPU 26 of game machine 10 may generate instructions for generating vibrations that simulate the sensation of holding the steering wheel of a race car during a race. The strength of these vibrations may be varied based on the car's speed, whether the car is turning, how much the car is turning, etc. Different vibrations may be generated when a car skids or crashes.

Figure 10:
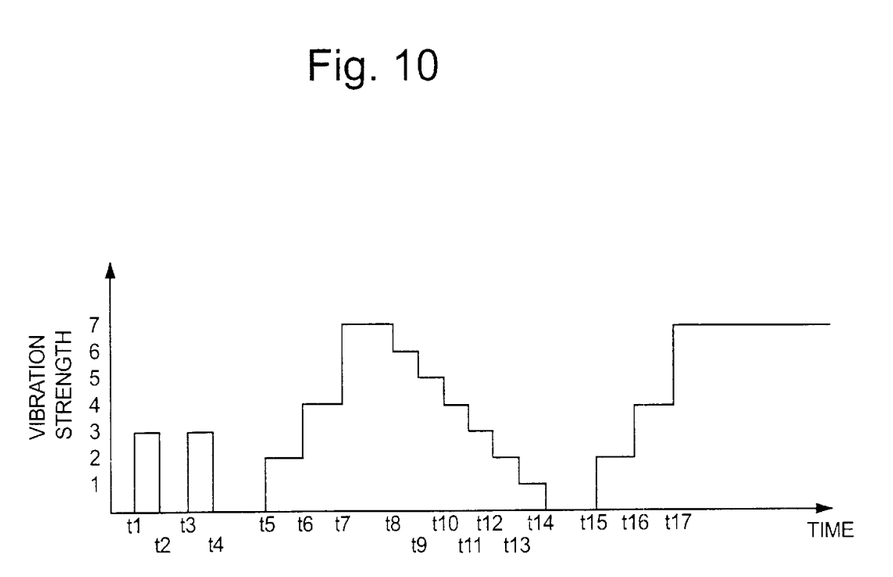
FIG. 10 is a graph showing one possible pattern of vibrations during game play.

FIG. 10 shows an example of a vibration generating pattern in a "Fishing Game". In the "Fishing Game" vibrations are generated in scenes such as "bait picking" in which a fish picks at the bait, "catching" in which a fish is hooked by a fishing hook, and "landing" in which a fish is brought from the water into a boat. In this way, it is possible to simulate the sensations of catching fish to the player of the "Fishing Game".

The times t1–t4 shown in FIG. 10 show a vibration pattern at the time of "bait picking". In "bait picking", since the fish only picks at the bait on the fishing hook, it is not necessary to generate large vibrations. Therefore, at time t1, CPU 26 outputs "1" for address $A_j$ and "110" for the data bits D0, D1 and D2. In response to data bits of "110", "0" (0 volts, for example) is outputted at a lowest output of latch 205 and "1" (3 volts, for example) is outputted at each of the upper outputs. Therefore, transistor 207 is turned-on at time t1 to apply a driving current to vibration source (motor) 47 so as to generate vibrations of vibration level "3". Thus, vibrations of vibration level "3" are generated at time t1, and these vibrations are conveyed to the hands of a player holding game machine 10. In this way, the player senses by the vibrations that the fish is picking at the bait.

Then, at time t2, CPU 26 makes address $A_j$ and data bits D1–D2 all "0". Therefore, transistor 207 is turned-off, and the driving current for vibration source 47 is also turned-off. Thus, the vibrations of cartridge housing 15, i.e. the vibrations of game machine 10 are stopped.

In order to provide the sensation to the player that "bait picking" is again taking place, CPU 26 outputs "1" for address $A_j$ and "110" for data bits D0–D2 at time t3. Therefore, at time t3, vibrations of vibration level "3" are generated by vibration source 47, and the vibrations are conveyed to the hands of the player holding game machine 10. Therefore, the player can sense by the vibrations that the fish is again picking at the bait.

Then, at time t4, CPU 26 makes address $A_j$ and data bits D0–D2 all "0". Accordingly, transistor 207 is turned-off, and the driving current to vibration source 47 is turned-off. The vibrations on cartridge housing 15 and on the housing of game machine 10 are stopped.

Times t5 to t14 show vibration patterns for "catching" a fish during the fishing game. In this case, CPU 26 outputs "1" for address $A_j$ and "010" for data bits D0–D2 at time t5. In response to the data bits "010", "1" (e.g. 3 volts) is outputted at the middle output of the latch 205, and "0" (e.g. 0 volts) is outputted on each of the upper and lower outputs. Therefore, at time t5, transistor 207 is turned on such that a driving current for generating vibrations of vibration level "2" is applied to vibration source (motor) 47. Therefore, at time t5, vibrations of vibration level "2" are generated by vibration source 47, and the vibrations are conveyed to the hands of the player holding game machine 10. Therefore, the player can sense by the vibrations that a fish is hooked (caught). At time t6, CPU 26 outputs "1" for address $A_j$ and "101" for data bits D0–D2. In response to data bits "101", "1" (3 volts, for example) is outputted at each of the upper and lower outputs of latch 205. Accordingly, at time t6, transistor 207 is turned on to apply a driving current for generating vibrations of vibration level "4" to vibration source (motor) 47. Therefore, vibrations of vibration level "4" are generated by vibration source 47 at time t6, and the vibrations are conveyed to the hands of the player holding game machine 10. At time t7, CPU 26 outputs "1" for address $A_j$ and "111"for data bits D0–D2. In response to data bits "111", 3 volts, for example, are outputted at all the outputs of latch 205. Accordingly, at time t7, transistor 207 is turned on such that a driving current for generating vibrations of vibration level "7" is applied to vibration source (motor) 47. Therefore, at the time t7, vibrations of vibration level "7" are generated by vibration source 47 and the vibrations are conveyed to the hands of the player holding game machine 10.

At time t8, CPU 26 outputs "1" for address $A_j$ and "011" for data bits D0–D2. In response to data bits "011", 3 volts, for example, are outputted at the upper two outputs of latch 205. Therefore, at time t8, transistor 207 applies a driving current for generating vibrations of vibration level "6" to vibration source (motor) 47. Accordingly, at time t8, vibrations of vibration level "6" are generated by vibration source 47, and the vibrations are then conveyed to the hands of the player holding game machine 10.

In a similar manner, during fish "catching", CPU 26 respectively outputs data "101", "001", "110", "010" and "100" at times t9, t10, t11, t12, t13 and t14. Therefore, at times t9, t10, t11, t12, t13 and t14, vibration source 47 generates vibrations at vibration levels "5", "4", "3", "2" and "1", and the vibrations are conveyed to the hands of the player holding game machine 10. Therefore, during times t5–t14, the player can sense by vibrations that are gradually increased and decreased that a fish has been caught.

After a time t15, a vibration pattern for bringing the fish into the boat is generated. In this case, at time t15, CPU 26 outputs "1" for address $A_j$ and "010" for data bits D0–D2. In response to data bits "010", "1" (e.g. 3 volts) is outputted at the middle output of latch 205, and "0" (e.g. 0 volts) is outputted at each of the upper and lower outputs. Therefore, at time t15, transistor 207 is turned on to apply a driving current for generating vibrations of vibration level "2" to vibration source (motor) 47. Therefore, at time t15, vibrations of vibration level "2" are generated by vibration source 47 and the vibrations are conveyed to the hands of the player holding game machine 10. Similarly, at time t16, CPU 26 outputs "1" for address $A_j$ and "101" for data bits D0–D2. In response to data bits "101", 3 volts, for example, are outputted to the lowest output of latch 205. Therefore, at time t16, transistor 207 applies a driving current for generating vibrations of vibration level "4" to vibration source 47. Therefore, at time t16, vibrations of vibration level "4" are generated by vibration source 47, and conveyed to the hands of the player holding game machine 10. At time t17, CPU 26 outputs "1" for address $A_j$ and "111" for data bits D0–D2. In response to data bits "111", 3 volts, for example, is outputted at all the outputs of latch 205. Accordingly, at time t17, transistor 207 is turned on such that a driving current for generating vibrations of vibration level "7" is applied to vibration source 47. Therefore, at time t17, vibrations of vibration level "7" are generated by vibration source and then conveyed to the hands of the player holding game machine 10. Thus, the player can sense by the vibrations that the fish is being brought into the boat.

The driving, stopping and vibration strength of vibration source 47 by CPU 26 are performed according to execution of the game program in game cartridge 12 in accordance with player inputs supplied via operating keys 48a–48e. Therefore, game programs can be developed to start, to stop and to change the strength of vibrations in response to the changes of the game images and sounds. In this way, the game playing experience may be enhanced.

It will be apparent that the discussion of vibrations in connection with the "Fishing Game" is for purposes of illustration, not limitation. Vibrations can be provided to enhance many different types of games including video pinball games, racing games, and the like.

The above description describes a vibration source that is composed of a single vibration generating device such as a motor, solenoid, etc. However, the invention is not limited in this respect and the vibration source may in fact include more than one motor, solenoid, etc. (or some combination thereof) arranged in different spaces within cartridge housing 15.

The above description describes an arrangement in which vibrations are generated based on the execution of a game program contained in a ROM of a game cartridge and on player inputs via operating keys 48a–48e. ROM 32 of game machine 10 (or some other ROM included within game machine 10) may itself store one or more games. CPU 26 of game machine 10 may be configured to use the vibration source of an attached game cartridge, if present, to generate vibrations when one of the game programs contained in ROM 32 (or some other ROM) of game machine 10 is executed.

In addition, game cartridge 12 may be configured with an indicator (not shown) such as an LED that is indicative of the power level of battery 53 for powering vibration source 47. Alternatively, CPU 26 of game machine 10 may be configured to detect the power level of battery 53 and provide a suitable message to the player on LCD 16 if the detected power level is below a certain predetermined level.

In addition, CPU 26 of game machine 10 may be responsive to user inputs for deactivating the vibration feature of a particular video game. Thus, for example, by appropriate manipulation of operating keys 48a–48e, a user may cause CPU 26 to not generate commands for starting vibration source 47.

Any patent documents mentioned above are hereby incorporated by reference into the present application.

Although the present invention has been described and illustrated in detail, this description is for illustrative purposes only and is not to be construed as limiting the present invention.

What is claimed is:

1. For use with a portable game machine having a processing system to execute a video game program and player controls operable by a user to generate video game control signals; a game cartridge comprising:

a housing;

a game memory for storing a video game program executable by said processing system;

electrical contacts that, in use, electrically connect said game cartridge to said processing system;

a vibration source for vibrating said housing; and a driving circuit responsive to instructions from said processing system for controlling said vibration source.

2. The game cartridge according to claim 1, wherein the instructions from said processing system include instructions for starting and stopping operation of said vibration source.

3. The game cartridge according to claim 1, wherein the instructions from said processing system include instructions for changing the strength of vibrations generated by said vibration source.

4. The game cartridge according to claim 1, wherein said vibration source comprises a motor.

5. The game cartridge according to claim 4, wherein said motor comprises an eccentric member that is attached to a rotating shaft.

6. The game cartridge according to claim 4, wherein said motor comprises an eccentrically mounted armature coil.

7. The game cartridge according to claim 1, wherein said vibration source comprises a solenoid.

8. The game cartridge according to claim 1, further comprising:

a battery for supplying power to said vibration source.

9. The game cartridge according to claim 8, further comprising:

an indicator for indicating a power level of said battery.

10. The game cartridge according to claim 8, wherein said processing system of said game machine is configured to detect a power level of said battery and to communicate a message to a user if the detected power level is less than a predetermined level.

11. The game cartridge according to claim 1, further comprising:

a read/write memory.

12. The game cartridge according to claim 11, further comprising:

a battery for supplying power to said read/write memory.

13. The game cartridge according to claim 1, wherein said vibration source is attached to said cartridge housing.

14. The game cartridge according to claim 1, wherein said vibration source comprises a plurality of vibration generating elements.

15. A portable game machine comprising:

a processing system;

player controls operable by a player to generate video game control signals;

a connector connected, in use, to a game cartridge including a vibration source and a memory storing a game program, wherein said processing system executes the video game program stored in the memory of said game cartridge and generates at least one instruction for controlling said vibration source of the game cartridge during execution of the video game program.

16. The portable game machine according to claim 15, wherein the at least one instruction includes instructions for starting and stopping operation of said vibration source.

17. The portable game machine according to claim 15, wherein the at least one instruction includes instructions for changing the strength of vibrations generated by said vibration source.

18. The portable game machine according to claim 15, wherein said processing system is responsive to inputs via said player controls to selectively de-activate operation of said vibration source during execution of a video game program.

19. A portable game machine comprising:

a video game program executing processing system for executing a video game program;

player controls accessible to a player holding said portable game machine, said player controls being operable by the player to generate video game control signals for said video game program; and a connector connected, in use, to a cartridge containing memory media for storing video game instructions for said video game program and a selectively driven vibration source arranged to generate vibrations that are transferred from a housing of said cartridge to said portable game machine, wherein said game program executing processing system accesses said video game instructions contained in said memory media and said video game instructions include at least one instruction for causing said game program executing processing system to provide an instruction to drive said vibration source to generate the vibrations.

20. The portable game machine according to claim 19, wherein the video game instructions include at least one further instruction for causing said game program executing processing system to provide an instruction to change the strength of vibrations generated by said vibration source.

21. A hand-held display system for playing a video game of a type that provides physical sensations to a player, said hand-held display system comprising:

a housing grippable by a player's hands;

a liquid crystal display viewable by the player gripping the housing;

input devices operable by the player when the player grips the housing;

a connector that connects, in use, to a cartridge including a memory storing a video game program for the video game, and a vibration source; and processing circuitry for processing the video game program and player inputs from the input devices in order to display game images on said liquid crystal display, wherein said processing circuitry controls said vibration source in accordance with the video game program so that physical sensations are provided to the player.

22. The hand-held display system according to claim 21, wherein said processing circuitry controls said vibration source to provide vibrations of different strengths.

23. The hand-held display system according to claim 21, wherein said vibration source is positioned at a portion of said cartridge opposite a portion thereof that connects to the connector of said hand-held display system.

24. The hand-held display system according to claim 23, wherein said cartridge further comprises a battery compartment that, in use, receives a battery for providing power to said vibration source.

25. A cartridge for use with a hand-held display system comprising a housing grippable by a player's hands; a liquid crystal display viewable by the player gripping the housing; input devices operable by the player when the player grips the housing; a connector; and processing circuitry: said cartridge comprising:

a housing;

a memory storing a video game program for a video game of a type that provides physical sensation to the player;

electrical contacts that, in use, connect to said connector to electrically connect said cartridge to said processing circuitry; and a vibration source for vibrating said housing, wherein said processing circuitry controls said vibration source in accordance with the video game program so that physical sensations are provided to the player playing the video game.

26. The cartridge according to claim 25, wherein said vibration source comprises a motor.

27. The cartridge according to claim 26, wherein said motor comprises an eccentric member attached to a rotating shaft.

28. The cartridge according to claim 26, wherein said motor comprises an eccentrically mounted armature coil.

29. The cartridge according to claim 25, wherein said vibration source comprises a solenoid.

30. The cartridge according to claim 25, wherein said vibration source is positioned at a portion of said cartridge opposite said electrical contacts.

31. The cartridge according to claim 25, further comprising:
a battery compartment that, in use, receives a battery for providing power to said vibration source.

32. The cartridge according to claim 25, further comprising:
a read/write memory.

33. A hand-held display system for playing a video game of a type that provides physical sensations to a player, said hand-held display system comprising:
a housing grippable by a player's hands;
a liquid crystal display disposed on a front surface of said housing and viewable by the player gripping the housing;
input devices disposed on the front surface of said housing and operable by the player when the player grips the housing;
a game cartridge slot provided on an upper portion of a rear surface of said housing, said game cartridge slot receiving, in use, a game cartridge including a memory storing a video game program for the video game, and a vibration source; and
processing circuitry for processing the video game program and player inputs from the input devices in order to display game images on said liquid crystal display,
wherein said processing circuitry controls said vibration source in accordance with the video game program so that physical sensations are provided to the player playing the video game.

34. A cartridge for use with a hand-held display system comprising a housing grippable by a player's hands; a liquid crystal display viewable by the player gripping the housing; input devices operable by the player when the player grips the housing; a connector; and processing circuitry; said cartridge comprising:
a ROM storing a video game program for a video game of a type that provides physical sensations to the player;
electrical contacts that, in use, connect to the connector of said hand-held display system so as to electrically connect said cartridge to the processing circuitry of said hand-held display system;
a vibration source; and
a battery compartment that, in use, receives a battery for providing power to said vibration source,
wherein said processing circuitry controls said vibration source in accordance with the video game program so that physical sensations are provided to the player playing the video game.

35. The cartridge according to claim 34, further comprising:
a read/write memory.

36. The cartridge according to claim 34, wherein said vibration source comprises a plurality of vibration generating elements.

37. The cartridge according to claim 34, wherein said ROM stores a video game program for a pinball game.

38. The cartridge according to claim 34, wherein said ROM stores a video game program for a racing game.

* * * * *